United States Patent
Lin

(10) Patent No.: US 7,586,221 B2
(45) Date of Patent: Sep. 8, 2009

(54) LOW VIBRATION HYBRID STEP MOTOR

(76) Inventor: Ted T. Lin, 12307 Crayside La., Saratoga, CA (US) 95070

( * ) Notice: Subject to any disclaimer, the term of this patent is extended or adjusted under 35 U.S.C. 154(b) by 548 days.

(21) Appl. No.: 11/535,644

(22) Filed: Sep. 27, 2006

(65) Prior Publication Data

US 2008/0074008 A1    Mar. 27, 2008

(51) Int. Cl.
*H02K 37/14* (2006.01)
(52) U.S. Cl. .................... 310/49 R; 310/114
(58) Field of Classification Search ........... 310/49 R, 310/112–114, 162–165
See application file for complete search history.

(56) References Cited

U.S. PATENT DOCUMENTS

| | | | | |
|---|---|---|---|---|
| RE25,445 E | * | 9/1963 | Fredrickson | ........ 310/163 |
| 4,626,719 A | * | 12/1986 | Foster | ........ 310/49 R |
| 4,947,066 A | | 8/1990 | Ghibu et al. | |
| 4,968,913 A | | 11/1990 | Sakamoto | |
| 5,272,401 A | * | 12/1993 | Lin | ........ 310/49 R |
| 5,668,430 A | * | 9/1997 | Kolomeitsev | ........ 310/266 |
| 5,969,454 A | | 10/1999 | Pengov et al. | |
| 6,028,385 A | | 2/2000 | Pengov et al. | |
| 6,323,574 B1 | * | 11/2001 | Takura | ........ 310/179 |
| 6,791,223 B2 | | 9/2004 | Suzuki et al. | |
| 7,003,867 B2 | | 2/2006 | Yamamoto et al. | |

* cited by examiner

*Primary Examiner*—Dang D Le
(74) *Attorney, Agent, or Firm*—Schneck & Schneck; Thomas Schneck; Mark Protsik

(57) ABSTRACT

A hybrid step motor has axially spaced first and second sets of rotor sections (or alternatively different sets of stator sections) characterized by different tooth widths. The rotor/stator tooth width ratio in one set is optimized for one-phase ON operation while the rotor/stator tooth width ratio for the other set is optimized for two-phase ON operation. More generally, the two sets are optimized together for near sinusoidal, torque profile and substantially equal microsteps.

10 Claims, 3 Drawing Sheets

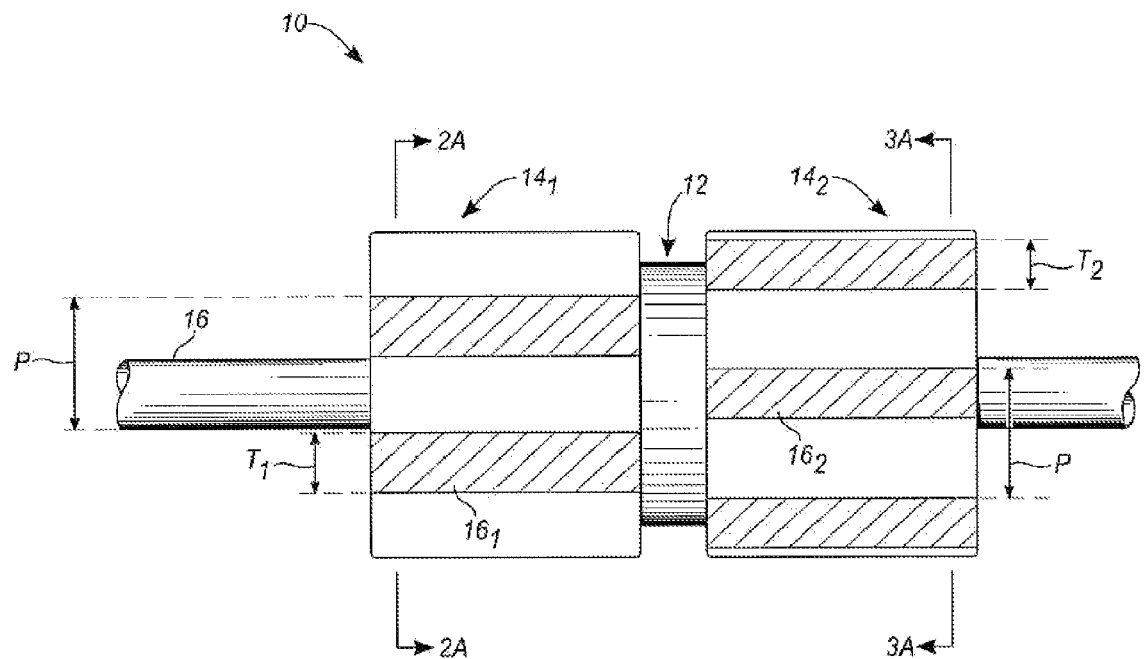
Fig. _ 1
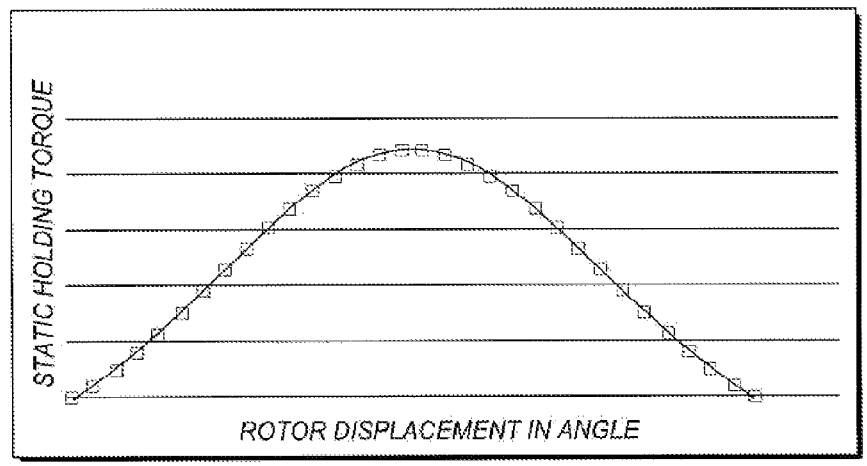
Fig. _ 4

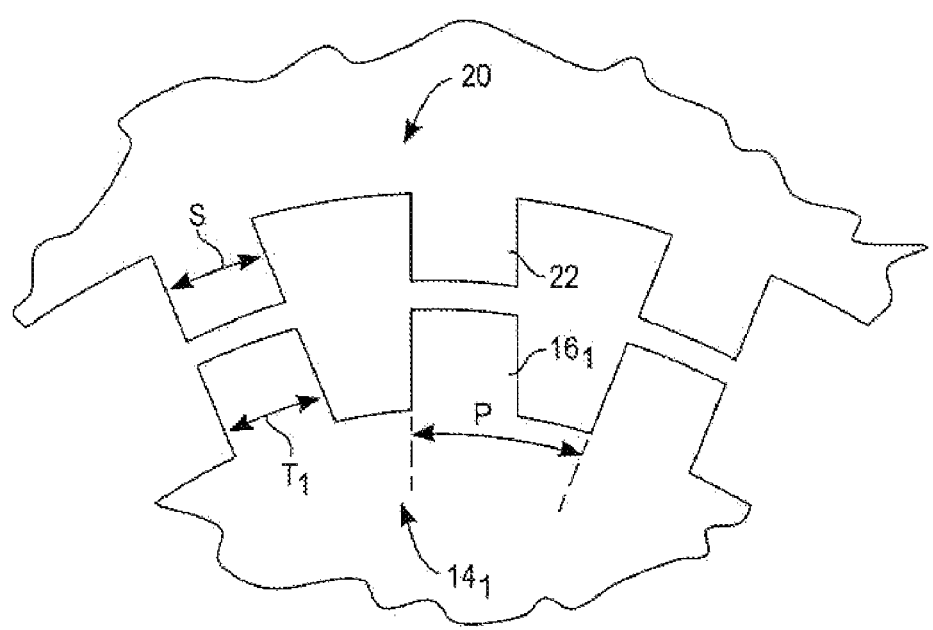
Fig. _2A
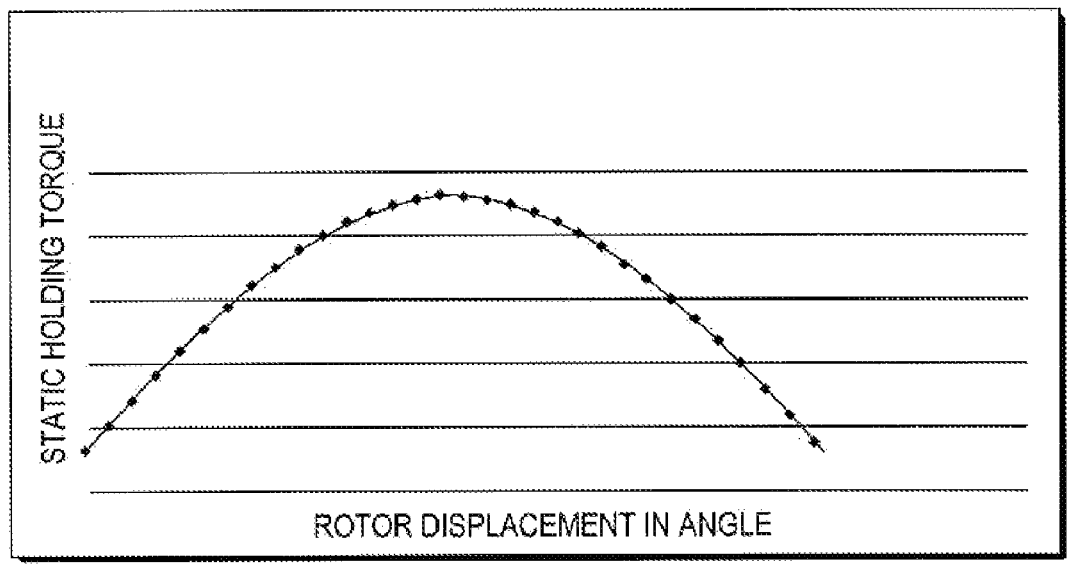
Fig. _2B

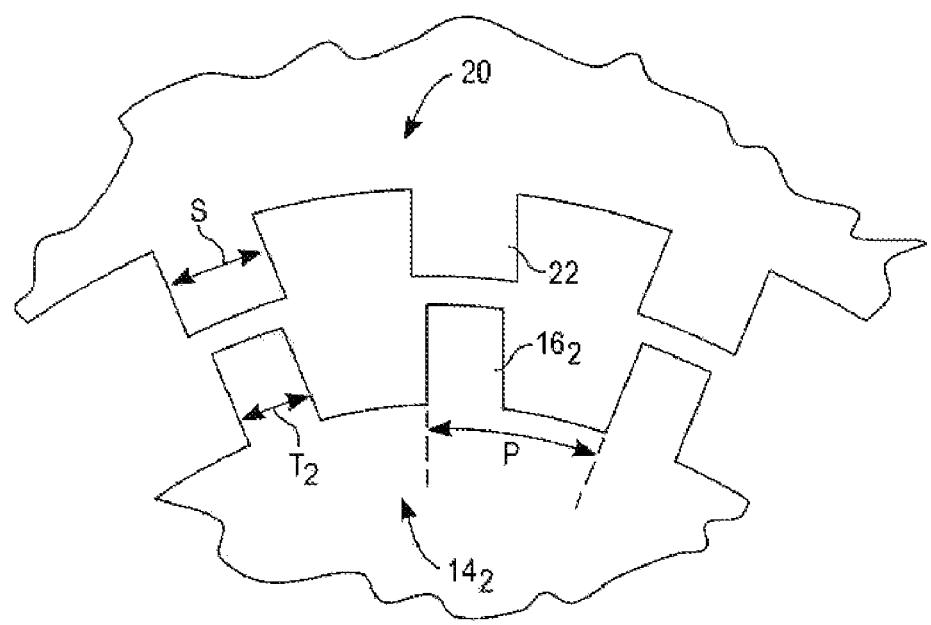
Fig._3A
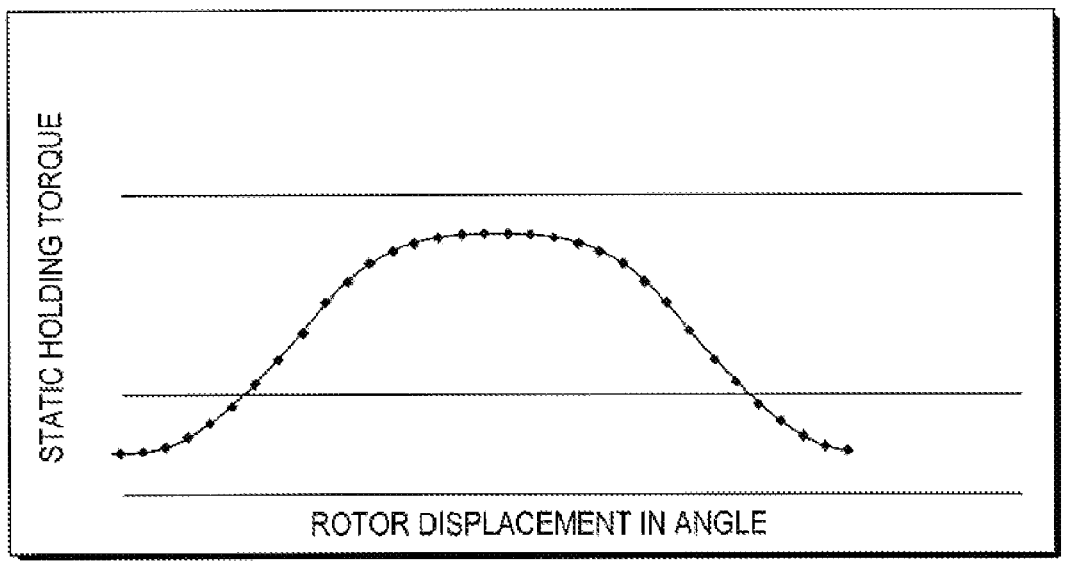
Fig._3B

LOW VIBRATION HYBRID STEP MOTOR

TECHNICAL FIELD

The present invention relates generally to electric motor structures designed to rotate step by step, i.e., step motors, and in particular to arrangements for reducing vibration and improving microstepping accuracy.

BACKGROUND ART

Step motors are used in a wide variety of applications that require precise motion control such as in printers, scanners, x-y tables, turntables, tape and disk drive systems, security cameras and other optical equipment, robotics, CNC (computer-numeric-control) machine tools, dispensers, and injector pumps. There have been many step motor designs introduced to achieve specific performance goals, such as reduced noise and vibration, increased resolution and accuracy of motor positions, and adequate holding torque and efficient power usage over a rare of motor speeds. Different modes of driving a step motor are available. The microstepping mode has been devised both to increase resolution of motor positions and to reduce vibration over other drive modes (full-stepping and half-stepping). Step motor design can be optimized to improve position accuracy when microstepping.

Varying the pitch angles of the stator teeth is the most common way to improve microstepping accuracy. The pitch angle of the rotor teeth must be constant it order to maintain a consistent step angle, so only the positions of the stator teeth are altered. Design work has also been done on the relationship between the rotor tooth width and stator tooth width, e.g., to achieve adequate holding torque, or to adjust for the particular stator tooth pitch design being used. In order to get the highest torque stiffness, the rotor tooth width should equal the stator tooth width for a one-phase ON operation; the rotor tooth width should be one-half of the stator tooth width for a full two-phase ON operation Because microstepping of a motor includes both one-phase ON and full two-phase ON conditions, as well as a wide range of intermediate conditions, at different motor positions, the relationship between the rotor tooth width and stator tooth width is chosen as a compromise to ensure adequate torque at all possible microstep positions. For maximum microstepping accuracy, a sinusoidal torque profile is desired. A typical design might have a rotor tooth width approximately 3/4 of the stator tooth width, with the exact value chosen being dependent on factors such as tooth geometry and the stator tooth pitch design. Other designs might use a rotor-to-stator tooth width ratio of approximately 1/4.

While microstepping reduces noise and vibration over other drive modes, there still tends to be some remaining erratic motion when the motor passes through a one-phase ON position, which is a stable detent position of the motor. This is known as the zero-crossing problem in step motor design. In a one-phase ON position full (100%) current is applied to one set of stator coils, while another set of coils is at a zero crossing point with no (0%) applied current. The rotor and stator teeth are at maximum alignment at this stable position. The rotor is very easily pushed into this natural detent position, but has greater difficulty pulling out from the position. This typically results in erratic jerks in rotor motion. One common solution is to reduce the rotor tooth width. However, while it is acceptable for full-stepping or half-stepping motors, this solution also produces a non-sinusoidal torque profile, and thereby causes uneven micro-steps. A solution for accurately and precisely microstepping motors is sought.

U.S. Pat. No. 6,791,223 to Suzuki et al. describes a low vibration step motor in which the rotor unit has a developed pattern of alternate S and N poles magnetized on its circumference. The widths of the S poles are set to be different from the widths of the N poles, while each pair of adjacent S and N poles is set to a predetermined constant value.

U.S. Pat. Nos. 5,969,454 and 6,028,385 to Pengov et al. describe respective two-phase and three-phase switched reluctance motors, comprising a stator having evenly spaced stator poles, with windings for two or three phases wound about the stator poles, and a rotor having at least two rotor sections. A first rotor section includes a number of wide rotor poles, while a second rotor section includes a number of narrow rotor poles. During each phase energization, the rotor is advanced in a two-step fashion. In a first step, the leading edge of the wide rotor poles interact with first energized stator poles to induce a first torque on the rotor and produce a first angular rotation of the rotor. Then, in a second step, the narrow rotor poles are drawn into alignment with second energized stator poles to induce a second torque and produce a second angular rotation of the rotor.

SUMMARY DISCLOSURE

The present invention is a hybrid step motor in which there are two axially displaced sets of rotor sections (or, alternatively, two sets of stator sections), each set having a different rotor/stator tooth width ratio than that of the other set. For example, one set may be optimized for one-phase ON operation (rotor/stator tooth width ratio near 1.0), while the other set may be optimized for two-phase ON operation (rotor/stator tooth width ratio near 0.5). More generally, the two sets are optimized together for near sinusoidal torque profile and substantially equal microsteps. The optimum rotor/stator tooth ratio is typically between 0.75 and 0.95, and the optimum tooth ratio between the two sets of rotor or stator sections is typically between 0.8 and 0.95.

BRIEF DESCRIPTION OF THE DRAWINGS

FIG. 1 is a side view of an exemplary rotor for a hybrid step motor in accord with the present invention.

FIG. 2A is a partial end view, taken along the lines 2A-2A in FIG. 1, of a first rotor section with wide rotor teeth, together with an associated portion of a stator, of an exemplary hybrid step motor in accord with the present invention.

FIG. 2B is a graph of the relative static holding torque contribution from the first rotor section versus rotor displacement angle.

FIG. 3A is a partial end view, taken along the lines 3A-3A in FIG. 1, of a second rotor section with narrow rotor teeth, together with an associated portion of a stator, of an exemplary hybrid step motor in accord with the present invention.

FIG. 3B an is a graph of the relative static holding torque contribution from the second rotor section versus rotor displacement angle.

FIG. 4 is a graph of the relative static holding torque of the exemplary hybrid step motor in accord with the present invention, combining the torque contributions from both rotor sections.

DETAILED DESCRIPTION

With reference to FIG. 1, an exemplary rotor 10 for a hybrid step motor in accord with the present invention comprises a permanent magnet 12 sandwiched between two rotor sections $14_1$ and $14_2$ on a rotor shaft 16. Alternative constructions may have more than two rotor sections laid out along the rotor shaft with permanent magnets between adjacent sections, where the rotor sections may belong to either of two alternating sets corresponding to the two rotor sections $14_1$ and $14_2$ shown in the exemplary embodiment of FIG. 1.

Generally, the step motor will also include a stator (not shown) having a plurality of stator poles with stator coil windings around the poles and coupled to a step motor driver. Any design may be used for the stator, its windings, and drive circuitry. Each of the stator poles has rotationally displaced stator teeth in magnetic coupling relation to the rotor teeth on the rotor, and characterized by a stator tooth width S (described in detail in FIGS. 2A and 3A, below). As noted below, in one possible alternative embodiment of the present invention, the stator teeth might be divided into two or more axially displaced sections with two different sets of stator tooth widths.

This embodiment of the present invention concerns the rotor teeth $16_1$ and $16_2$, and, in particular, the tooth widths $T_1$ and $T_2$ of the rotor sections $14_1$ and $14_2$. The teeth $16_1$ of the first rotor section $14_1$ have a width $T_1$ that, is different from the width $T_2$ of the teeth $16_2$ of the second rotor section $14_2$. As seen in FIGS. 1 and 2A, the first rotor section $14_1$ has a rotor tooth width $T_1$ approximately equal to the stator tooth width S, for a rotor/stator tooth width ratio. $T_1/S \approx 1$. For a typical optimized hybrid motor construction in accord with the present invention, $T_1/S$ may actually be closer to 0.95. Note that it is also possible in some motor designs for the rotor teeth to be, wider than the stator teeth, for a ratio $T_1/S>1$, for example 1.05; but in most cases optimization appears to favor rotor/stator tooth width ratios that tend to be less than 1.

As seen in FIGS. 1 and 3A, the second rotor section $14_2$ has a rotor tooth width $T_2$ approximately equal to, or slightly wider than, about half the stator tooth width S, for a rotor/stator tooth width ratio $T_2/S \approx 0.5$. For a typical optimized hybrid motor construction in accord with the present invention, $T_2/S$ may actually be closer to 0.75 or 0.8 for a more sinusoidal torque profile. The two rotor sections $14_1$ and $14_2$, or two sets of rotor sections, have a tooth ratio between them, $T_1/T_2$ in a range between, 0.8 and 0.95.

Alternatively, the stator teeth widths in two sets of sections might be varied to give two different rotor/stator tooth width ratios $T/S_1$ and $T/S_2$, where $S_1$ and $S_2$ are stator tooth widths for the different stator sections.

In all cases, notwithstanding the differences in tooth widths, the positions of the rotor teeth around the rotation axis are characterized by a constant and equal pitch P, as seen in FIGS. 2A and 3A, for uniform stepping. Also, as seen in FIG. 1, the teeth $16_1$ on one set of rotor sections $14_1$ are offset by one-half rotor tooth pitch from the teeth $16_2$ on the other set of rotor sections $14_2$. The stator teeth positions may be varied, as is known in the art.

With reference to FIGS. 2B, 3B, and 4, the torque contributions of two sets of rotor (or stator) sections create a composite torque profile that should be substantially sinusoidal, when optimized by proper selection of tooth width ratios. The torque contribution from the second section $14_2$, with its narrower rotor/stator tooth width ratio, tends to be somewhat non-sinusoidal when $T_2/S$ approaches 0.5, as seen in FIG. 3B. Accordingly, an optimized ratio $T_2/S$ is made closer to 0.75 or 0.8 for a more sinusoidal profile. The torque contribution from the first section $14_1$, width its wider rotor/stator tooth width ratio would be quite sinusoidal when $T_1/S$ approaches 1.0, as seen in FIG. 2B. However, its optimized ratio may be reduced somewhat to about 0.95, in order that the composite torque profile (FIG. 4) from both torque contributions will be substantially sinusoidal, so that the microsteps will be substantially equal over a full step. Magnetic flux analysis can be modeled, if desired, using finite element analysis and the like, to obtain an optimum set of rotor/stator tooth ratios. However, because the magnetic flux analysis is very complicated, optimization can also be done experimentally. A range of possible rotor/stator tooth width ratios from 0.75 to 0.95 for the different sections can be selected, and the resulting microstep uniformity evaluated for each trial combination.

The invention claimed is:

1. A hybrid step motor, comprising:
    a stator having a plurality of stator poles with a plurality of rotationally displaced stator teeth on said poles; and
    a multi-section rotor having a plurality of rotationally displaced rotor teeth in magnetic coupling relation to the stator teeth, the rotor including at least one first rotor section and at least one second rotor section axially displaced from the first rotor section, the rotor teeth in both rotor sections having a constant rotor tooth pitch, the rotor teeth of the first section displaced from the rotor teeth of the second section by one-half of the rotor tooth pitch,
    wherein at least one of the stator and rotor has axially displaced first and second sets of teeth characterized by different tooth widths, such that a rotor/stator tooth width ratio for a first set of teeth is generally optimized for one phase ON operation and a rotor/stator tooth width ratio for a second set of teeth is generally optimized for two phase ON operation, and the rotor/stator tooth width ratios for the two sets of teeth are together optimized for substantially uniform microsteps.

2. The hybrid step motor as in claim 1, wherein axially displaced sets of rotor teeth have different rotor tooth widths.

3. The hybrid step motor as in claim 1, wherein axially displaced sets of stator teeth have different stator tooth widths.

4. The hybrid step motor as in claim 1, wherein a rotor/stator tooth width ratio for a first set of teeth is less than or equal to 1.0.

5. The hybrid step motor as in claim 1, wherein a rotor/stator tooth width ratio for a first set of teeth is less than or equal to 0.95.

6. The hybrid step motor as in claim 1, wherein a rotor/stator tooth width ratio for a second set of teeth is greater than or equal to 0.5.

7. The hybrid step motor as in claim 1, wherein a rotor/stator tooth width ratio for a second set of teeth is greater than or equal to 0.75.

8. The hybrid step motor as in claim 1, wherein the rotor/stator tooth width ratio for each set of teeth is selected from a range between 0.75 and 0.95.

9. The hybrid step motor as in claim 1, wherein the optimizations of rotor/stator tooth width ratios for the separate first and second sets for respective one-phase ON and two-phase ON operation are made on a basis of near sinusoidal torque profile contributions, and the optimization of the two sets together for substantially uniform microsteps is made on a basis of substantially sinusoidal composite torque profile.

10. A hybrid step motor, comprising:
    a stator having a plurality of stator poles with a plurality of rotationally displaced stator teeth on said poles; and
    a multi-section rotor having a plurality of rotationally displaced stator teeth in magnetic coupling relation to the stator teeth, the rotor including at least one first rotor section and at least one second rotor section axially displaced from the first rotor section, the rotor teeth in both rotor sections having a constant rotor tooth pitch, the rotor teeth of the first section displaced from the rotor teeth of the second section by one-half of the rotor tooth pitch, wherein at least one of the stator and rotor has axially displaced first and second sets of teeth characterized by different tooth widths, such that a rotor/stator tooth width ratio for a first set of teeth is less than or equal to 0.95 and generally optimized for one phase ON operation, a rotor/stator tooth width ratio for a second set of teeth is greater than or equal to 0.75 and generally optimized for two phase ON operation, and a ratio of relative tooth widths between the second and first sets of teeth being selected to be in a range between 0.75 and 0.95 and optimized for substantially uniform microsteps.

* * * * *

UNITED STATES PATENT AND TRADEMARK OFFICE
CERTIFICATE OF CORRECTION

PATENT NO. : 7,586,221 B2 Page 1 of 1
APPLICATION NO. : 11/535644
DATED : September 8, 2009
INVENTOR(S) : Ted T. Lin It is certified that error appears in the above-identified patent and that said Letters Patent is hereby corrected as shown below:

Column 1, line 31 reads: "...teeth must be constant it order to maintain...."
    should read --...teeth must be constant in order to maintain...--.

Column 2, line 56 reads: "FIG. 3B an is a graph of the relative static..."
    should read --FIG. 3B is a graph of the relative static--.

Column 3, line 64 reads: "...first section $14_1$, width its wider..."
    should read --...first section $14_1$, with its wider--

Signed and Sealed this

Twenty-fourth Day of November, 2009

David J. Kappos
*Director of the United States Patent and Trademark Office*